United States Patent Office 3,513,583
Patented May 26, 1970

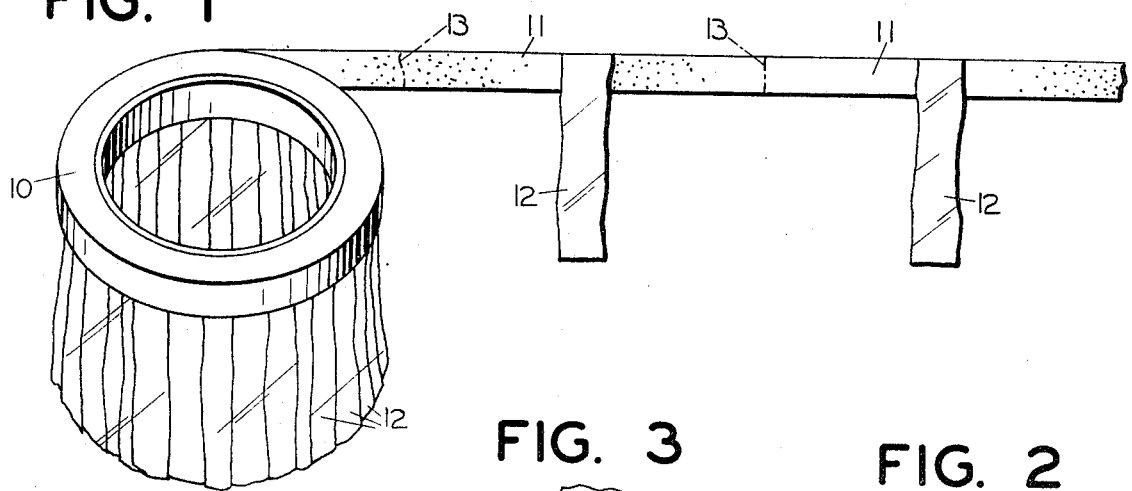
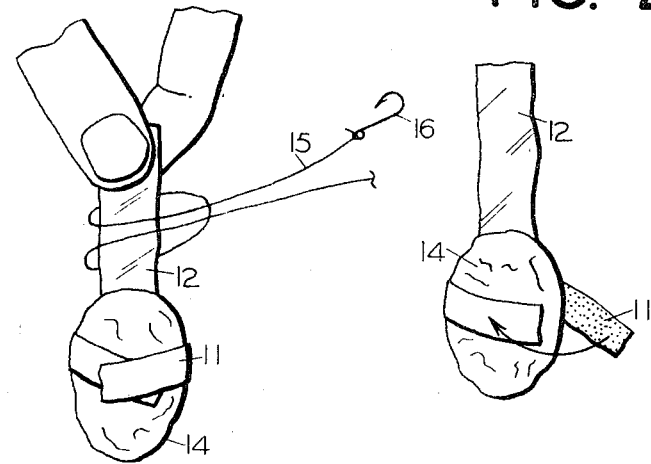
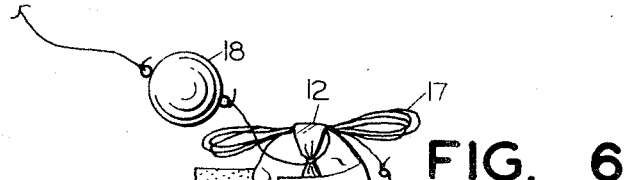
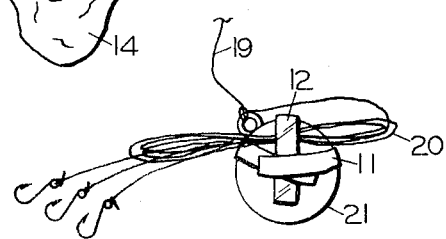
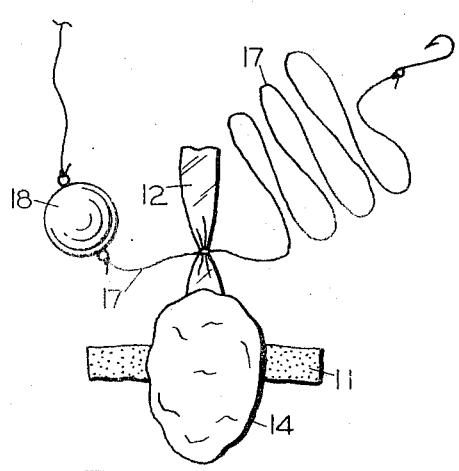

3,513,583
ATTACHING MEANS WITH RELEASABLE SECURING TAB FOR EXPENDABLE SINKER
Neil A. Leash, 8212 Valewood Court, Orangevale, Calif. 95662, and Kenneth H. Leash, 2204 NE. 7th Ave., Portland, Oreg. 97212
Filed Sept. 16, 1968, Ser. No. 759,849
Int. Cl. A01k 95/00
U.S. Cl. 43—43.12
2 Claims

ABSTRACT OF THE DISCLOSURE

An adhesive coated tape element capable of being quickly attached to an expendable sinker and provided with a releasing tab extending therefrom for securing the element and attached sinker to a fishing line. The tab is formed of material having adequate tensile strength when dry but which decomposes upon contact with water to release the sinker from the line.

BACKGROUND OF THE INVENTION

The desirability of having a sinker which can be released from the fish line after the line, with the aid of the sinker, has been cast to the approximate destination desired, has long been recognized. The releasing of the sinker then enables the line with the hook, bait or lure to drift or float or settle in a natural manner, avoids the possibility of having an attached sinker acting as an impediment in retrieving the line or landing the fish and aids in hooking the fish.

U.S. Pat. No. 2,308,238, issued Jan. 12, 1943, to Baker, teaches the use of means having adequate tensile strength when dry but which loses most of its tensile strength when wet, for attaching a sinker to the line. U.S. Pat. No. 2,754,614, issued July 17, 1956, to Yakel, and U.S. Pat. No. 2,814,902, issued Dec. 3, 1957, to Matteson, describe specially constructed sinkers provided with water soluble means for attaching the sinker to the line. U.S. Pat. No. 3,081,574, issued Mar. 19, 1963, to Wise, describes a specially constructed metal clip by which various expendable objects capable of serving as temporary sinkers may be attached to the fishing line and released by the clip after the clip has contacted the water.

The devices in these patents, however, either necessitate the use of specially constructed sinkers, or specially constructed fastening means for the sinker, or require expenditure of a certain amount of time and labor on the part of the fisherman whenever they are to be used. The object of the present invention is to provide very inexpensive and simple means whereby any object, capable of serving momentarily as an expendable sinker, can be quickly and easily attached to the fishing line and which will automatically release the expendable sinker when the sinker has served to carry the line to the desired approximate destination.

OUTLINE OF THE INVENTION

The invention, in brief, comprises pressure sensitive adhesive tape, capable of taking a firm hold on any object to which it is applied, and thus on any object suitable for use temporarily as an expendable sinker, which tape comprises a series of identical sections with each section carrying a tab or strip of material having sufficient tensile strength, when dry, to support the weight of the object to which the section of tape may be attached, but which material loses its tensile strength when immersed in water. In the employment of the invention the fisherman attaches a section of the tape to the object to be used as the expendable sinker and attaches the fishing line to the sinker through the medium of the tab or strip of water-decomposable material carried by the tape.

BRIEF DESCRIPTION OF THE DRAWINGS

In the drawings:

FIG. 1 is a perspective view of a roll of the adhesive tape material with a tab or strip of water-decomposable material attached to each successive section of the tape, a couple of end sections on the tape being shown loosened from the roll;

FIG. 2 illustrates how a section of the tape may be applied to a pebble which is to serve as the expendable sinker;

FIGS. 3 and 4 illustrate a manner in which the expendable sinker may be temporarily secured on the fish line through the intermediary of the tab or water-decomposable strip carried by the tape section which has been attached to the sinker;

FIGS. 5 and 6 illustrate the manner in which the invention may be employed when it is desired to carry a longer length fish line, to which a float or bobber is attached, on down in the water; and FIG. 7 illustrates how a plurality of branch lines, attached to the end of the main line and to a regular sinker may be temporarily carried by the regular sinker and then automatically released from the sinker in the water.

Referring first to FIG. 1, the roll 10 comprises a series of equal sections 11 of the tape, with a tab or strip 12 of material attached to the adhesive face of the tape at the central portion of each of the sections or lengths.

Preferably, although not necessarily, the division line between the successive sections 11 of the tape is indicated on the tape, either by a stamped or printed mark or, in the event the material from which the body of the tape is composed makes the tearing off of the sections or lengths difficult, by a line of perforations, as indicated at 13 in FIG. 1, to facilitate the separation of each section in turn from the roll.

The tabs or strips 12 which have one end attached to the sections of tape 11, respectively, extend in the same direction substantially at right angles to the tape, and are formed of material having adequate tensile strength when dry, as previously mentioned, but which material rapidly decomposes and loses its tensile strength upon contact with the water. The material which has been found to be very satisfactory for these tabs or strips is plasticized polyvinyl alcohol, the characteristics of which are well known.

FIGS. 2, 3 and 4 show how a pebble 14, of sufficient size and weight for use as a sinker, may be quickly and easily attached to the fish line. A separated section or length of the tape is firmly attached to the pebble or sinker in the manner shown in FIG. 2, the adhesive side of the tape being pressed into contact with the pebble, thus leaving the tab or strip 12 extending from the pebble. The strip 12 is then secured to the fish line 15 at the desired location with respect to the hook 16. While the fish line and strip 12 may be secured together in several ways, a preferred and very simple way of doing this is to form a double loop with the line, pass the strip 12 through the loop, as shown in FIG. 3, and then pull the loop tight as shown in FIG. 4. The advantage in following this particular procedure is not only can it be done so easily and quickly, but also that there is no possibility of any knot being left in the line when the strip 12 disintegrates.

FIG. 4 illustrates the employment of the invention when it is desired to have the expendable sinker mounted close to the hook and near the end of the line. FIGS.

5 and 6 illustrate how the invention may be employed for the casting of a line with a float or bobber on the line and with the hook located at a distance on the line from the bobber. In such case the line 17 is secured to the strip 12 close to the bobber 18, as illustrated in FIG. 5, before the length of tape 11 is completely attached to the sinker. The remaining portion of the line to the hook is then formed into a series of open loops. Finally the extending end of the strip 12 is placed over these loops of the line and secured tightly down on the sinker beneath by being held under the end or ends of the tape 11, as shown in FIG. 6.

The invention may also be employed with a regular sinker for temporarily holding branch lines during the casting, as illustrated in FIG. 7. Here is a regular sinker 21 and several branch lines 19 are attached to the end of the main fish line 20. The branch lines 19 are looped and temporarily attached to the regular sinker 21 in the manner illustrated. In such case the disintegration of the strip 12 and the freeing of the branch lines from the regular sinker will enable the branch lines with their hooks to drift out with the current a few seconds after reaching the water.

We claim:

1. An article of fishing tackle for use in releasably securing fishing lines to sinkers comprising a roll of tape material having a coating of pressure sensitive adhesive on one face, the tape material divided into sections of equal length, a tab secured to and extending from each tape section in a direction substantially normal to the tape, said tabs composed of material having sufficient tensile strength when dry to enable the tab to withstand the stress imposed when serving as the connecting medium between a sinker and a fishing line during casting, but quickly losing such tensile strength upon contact with water, whereby an object suitable for use as a dispensable sinker may be quickly and easily attached to the fishing line by securing one of said tape sections to the dispensible sinker and securing the tab on said section to the fishing line, and whereby the decomposing of the tab upon contact with the water will result in quick release of the sinker.

2. The article of fishing tackle as set forth in claim 1 with said sections of said tape marked by dividing lines of perforations and with said tabs formed of plasticized polyvinyl alcohol.

References Cited

UNITED STATES PATENTS

| | | | |
|---|---|---|---|
| 2,308,238 | 1/1943 | Baker | 43—43.12 |
| 2,814,902 | 12/1957 | Matteson | 43—43.12 |

SAMUEL KOREN, Primary Examiner

D. J. LEACH, Assistant Examiner